US006989355B1

(12) United States Patent
Campbell et al.

(10) Patent No.: US 6,989,355 B1
(45) Date of Patent: Jan. 24, 2006

(54) UNDER-NEUTRALIZED ALKYLXYLENE SULFONIC ACID COMPOSITION FOR ENHANCED OIL RECOVERY PROCESSES

(75) Inventors: Curt B. Campbell, Hercules, CA (US); Gilles P. Sinquin, Richmond, CA (US)

(73) Assignee: Chevron Oronite Company LLC, San Ramon, CA (US)

( * ) Notice: Subject to any disclaimer, the term of this patent is extended or adjusted under 35 U.S.C. 154(b) by 17 days.

(21) Appl. No.: 10/893,045

(22) Filed: Jul. 15, 2004

(51) Int. Cl.
*C09K 7/02* (2006.01)
*C07C 309/00* (2006.01)
*E21B 43/16* (2006.01)

(52) U.S. Cl. .................. 507/259; 562/91; 507/211; 507/225; 507/261; 507/262; 507/266; 166/305.1; 166/270.1

(58) Field of Classification Search ................ 562/91; 507/259, 211, 225, 261, 262, 266; 166/305.1, 166/270.1
See application file for complete search history.

(56) References Cited

U.S. PATENT DOCUMENTS

| | | | |
|---|---|---|---|
| 3,601,198 A | 8/1971 | Ahearn et al. | |
| 4,005,749 A | 2/1977 | Birk et al. | |
| 4,067,818 A | * 1/1978 | Marin | 252/88.1 |
| 4,217,958 A | 8/1980 | Doster et al. | |
| 4,452,308 A | 6/1984 | Haskin et al. | |
| 4,452,708 A | 6/1984 | Aldrich et al. | |
| 4,476,929 A | 10/1984 | Stapp | |
| 4,589,489 A | 5/1986 | Volz et al. | |
| 4,608,204 A | 8/1986 | Lew et al. | |
| 4,690,785 A | 9/1987 | Mausner et al. | |
| 4,873,025 A | 10/1989 | Bolsman | |
| 4,932,473 A | 6/1990 | Borchardt | |
| 5,804,094 A | * 9/1998 | Alcock et al. | 508/390 |
| 6,022,834 A | 2/2000 | Hsu et al. | |
| 6,043,391 A | 3/2000 | Berger et al. | |
| 6,269,881 B1 | 8/2001 | Chou et al. | |

FOREIGN PATENT DOCUMENTS

| | | |
|---|---|---|
| EP | 0 111 354 B1 | 12/1986 |
| EP | 0 148 517 B1 | 9/1988 |
| EP | 0 158 486 B1 | 12/1988 |
| EP | 0 413 374 B1 | 4/1994 |
| GB | 2 138 866 A | 10/1984 |
| WO | WO 01/98432 A2 | 12/2001 |

* cited by examiner

*Primary Examiner*—Philip C. Tucker
(74) *Attorney, Agent, or Firm*—Sarita B. Kelley

(57) ABSTRACT

The present invention is directed to an under-neutralized alkylxylene sulfonic acid composition for enhanced oil recovery processes. The present invention is also directed to a method for enhancing the recovery of oil from a subterranean reservoir which method employs the under-neutralized alkylxylene sulfonic acid compositions of the present invention. The under-neutralized alkylxylene sulfonic acid compositions are employed in an aqueous media. The method optionally employs suitable co-surfactants, such as alcohols, alcohol ethers, polyalkylene glycols, poly(oxyalkylene)glycols and/or poly(oxyalkylene)glycol ethers.

48 Claims, 4 Drawing Sheets

UNDER-NEUTRALIZED ALKYLXYLENE SULFONIC ACID COMPOSITION FOR ENHANCED OIL RECOVERY PROCESSES

FIELD OF THE INVENTION

The present invention is directed to an under-neutralized alkylxylene sulfonic acid composition for enhanced oil recovery processes. The present invention is also directed to a method for enhancing the recovery of oil from a subterranean reservoir which method employs the under-neutralized alkylxylene sulfonic acid compositions of the present invention. The under-neutralized alkylxylene sulfonic acid compositions are employed in an aqueous media. The method optionally employs suitable co-surfactants, such as alcohols, alcohol ethers, polyalkylene glycols and/or poly(oxyalkylene)glycols and poly(oxyalkylene)glycol ethers.

BACKGROUND OF THE INVENTION

Crude oil production from oil in subterranean reservoirs may involve use of various flooding methods as the natural forces that are used in the "primary recovery" process become depleted. A large portion of the crude oil may have to be driven out of the formation in "secondary" or "tertiary" recovery processes. In addition, some reservoirs may not have sufficient natural forces for oil production even by primary recovery processes. The production of crude oil using such flooding methods is one example of enhanced oil recovery processes.

One trend in the petroleum industry now is to plan exploitation of the oil field at the beginning of the project. Injecting a displacing fluid or gas may begin early, long before the complete depletion of the field by primary recovery techniques. Methods for improving displacement efficiency or sweep efficiency may be used at the very beginning of the first injection of a displacing fluid or gas, rather than under secondary and tertiary recovery conditions.

The least expensive and easiest method of flooding a subterranean reservoir for the production of crude oil is by injecting a liquid or a gas into the well to force the oil to the surface. Water flooding is the most widely used fluid. However, water does not readily displace oil because of the immiscibility of water and oil and the high interfacial tension between the two liquids.

The addition of chemicals to modify the properties of the flooding liquid is well known in the art. Surfactants are one class of chemical compounds that have been used in aqueous media for enhanced oil recovery. Surfactants have been found to effectively lower the interfacial tension between oil and water and enabling the oil droplets to flow more easily through the channels of the reservoir.

Alkylaryl sulfonates have been used as surfactants for enhanced oil recovery. They have been used in surfactant flooding, alone or in conjunction with co-surfactants and/or sacrificial agents. Alkylaryl sulfonates are generally used not only because they are able to lower the interfacial tension between oil and water, but also because when used in conjunction with varying amounts of sodium chloride they exhibit different phase behavior. At low salinity, alkylaryl sulfonates have a tendency to stay in the aqueous phase, but at high salinity they tend to stay in the oil phase. Around mid-point salinity, a micro-emulsion forms in which appreciable amounts of oil and brine are in the micro-emulsion phase. It is at this mid-point salinity that the surfactant exhibits high oil recovery potential. The salinity of the water in subterranean hydrocarbon reservoirs may vary a great deal, for example, the Minas oil field in Indonesia has total dissolved salts of between 0.2 and 0.3 weight percent. Other reservoirs may have salinities as high as or higher than 2.0 percent sodium chloride and over 0.5 percent calcium chloride and magnesium chloride. It is desirable to optimize the alkylaryl sulfonates for surfactant flooding for enhanced oil recovery for a particular reservoir by determining the interfacial tension of the reservoir oil in an aqueous brine solution containing the alkylaryl sulfonates which matches the salinity of the reservoir water.

Generally, pure alkylaryl sulfonates, that is, those having a narrow range of molecular weights, are useful for recovery of light crude oils. Such alkylaryl sulfonates have been less useful for enhancing oil recovery of crude oils containing high wax content. Alkylaryl sulfonates having a broad spectrum of carbon chain lengths in the alkyl group are more desirable for use to recover waxy crude oils.

A number of patents and patent applications have discussed methods for enhanced oil recovery using surfactant flooding. In addition to the use of surfactants, there are a number of patent and patent applications discussing the use of co-surfactants and sacrificial agents for enhanced oil recovery.

EP 0 111 354 B1 discloses the use of alkylxylene sulfonate compounds derived from alkyl meta- and para-xylenes in methods for displacing oil from reservoirs of relatively higher salinities than those to which the conventional alkyl-ortho-xylene sulfonate compounds are limited.

EP 0 148 517 B1 discloses olefin sulfonate compositions comprising an aqueous solution containing 15 to 35 weight percent of a blend of a $C_{12}$–$C_{22}$ linear alpha-olefin and an alkylaryl sulfonate wherein the aryl group is a benzene, toluene or xylene. The compositions are used in foam drive processes for enhanced oil recovery.

EP 0 158 486 B1 discloses the use of polyalkyl aromatic sulfonates, particularly dialkyl aromatic sulfonates in steam recovery methods for enhancing oil recovery. The increase of the ratio of para-isomer to meta-isomer results in a significantly more hydrolytically, thermally stable surfactant under steam recovery operating conditions.

EP 0 413 374 B1 discloses the use of alkylxylene sulfonates and a glycol for enhanced oil recovery. The alkyl group containing 8 to 30 carbon atoms is attached to the aromatic ring from its 2-position to its mid-position. The glycol is used as a sacrificial agent.

GB 2 138 866 A discloses a micellar slug for use in the recovery of oil consisting essentially of a hydrocarbon, an aqueous medium, a surfactant and a co-surfactant. The surfactant containing, as essential constituents, an internal olefin sulfonate having 10 to 26 carbon atoms and at least one ethoxylate. The micellar slug has an improved salinity tolerance and hard-water resistance and is capable of forming micro-emulsions having low interfacial tension and good stability.

U.S. Pat. No. 3,601,198 discloses the use of oil-soluble anionic surface-active agents or detergents, such as sulfonates, petroleum and synthetic, for a hydraulic fracturing operation. The synthetic sulfonates are alkaline earth metal salts of high molecular weight sulfonic acids and are produced using aromatics, such as benzene, toluene, xylene and naphthalene. The molecular weights of the sulfonates are in the range between 300 and about 750.

U.S. Pat. No. 4,005,749 discloses the use of polyalkylene oxides as sacrificial agents prior to surfactant flooding in enhanced oil recovery process. The polyalkylene oxides have molecular weights of at least 1,200. The surfactant flood is an aqueous slug containing a surfactant exhibiting a lower molecular weight than that of the polyalkylene oxides. The sacrificial agent may also be used along with the surfactant flooding, but its concentration is lower than when used as a sacrificial agent.

U.S. Pat. No. 4,217,958 discloses the use of sacrificial agents, polybasic carboxylic acid or their water soluble salts, in admixture with a chemical oil recovery agent, such as a surfactant, a polymer, and/or a micellar dispersion to reduce the adsorption of surfactants and/or the polymers on reservoir rocks.

U.S. Pat. No. 4,452,708 discloses an oil recovery method using a particular class of alkylaryl sulfonate surfactants. The surfactants are derived from an extracted aromatic feedstock consisting essentially of benzene, toluene, xylene and lesser amounts of alkylbenzene alkylated with linear alpha-olefins to favor a second-carbon attachment. The sulfonates have a high oil solubilization parameters and their phase behavior is substantially independent of temperature over 120° F.–250° F.

U.S. Pat. No. 4,476,929 discloses the use of co-surfactants, a sulfoxide, having a maximum of 14 carbon atoms, in surfactant systems for enhanced oil recovery processes. The preferred surfactant is a petroleum sulfonate having average equivalent weights in the range of about 325 to 500.

U.S. Pat. No. 4,452,308 discloses the use of polyalkylene glycols or copolymers thereof having molecular weights between 100 and 1,200 with chemical flooding. The concentration of the polyalkylene glycols used is 0.01–0.5 weight percent. The preferred polyalkylene glycols are polyethylene and polypropylene glycols.

U.S. Pat. No. 4,589,489 discloses the use of polyalkylene glycols or their copolymers for surfactant flooding or for preflushing. It is preferred to use polyethylene glycol having a molecular weight of from 800 to about 1,100. The concentration used is dependent on the subterranean formation, for example, between 1–100 kilograms per cubic meter.

U.S. Pat. No. 4,608,204 discloses a process for the preparation of a low viscosity aqueous alkyltoluene or alkylxylene sulfonate with the addition of sodium chloride during neutralization or after neutralization. Such low viscosity sulfonates are useful as surfactants in enhanced oil recovery processes. When xylene is employed, a mixture of the three isomers, ortho-, meta- and para-, are preferred.

U.S. Pat. No. 4,690,785 discloses low water neutralization energy-saving process to produce highly active alkylaryl sulfonate by combining an alkylaryl sulfonic acid with a salt-forming base, and utilizing the heat generated during the neutralization reaction to drive off the water present in the reaction mixture. The resulting free flowing alkylaryl sulfonate powder is at least 90 percent active. When dissolved in water, the powdered product will have a pH of about 4.6 to about 11.5, usually about 7 or about 8.

U.S. Pat. No. 4,873,025 discloses compositions comprising alkylxylene sulfonates in which a substantial portion of the alkylxylene sulfonate fraction has the $C_6$–$C_{20}$ substituents, positioned directly opposite to the sulfonate moiety. Such compositions are derived from para-xylene or isomer mixtures comprising substantially para-xylene. These alkylxylene sulfonates are useful as surfactants, particularly in enhanced oil recovery techniques.

U.S. Pat. No. 4,932,473 discloses a process for enhanced oil recovery employing one or more alkyltoluene sulfonates in an aqueous saline aqueous solution. The improvement comprises including into the said solutions one or more alkylpolysaccharide surfactants for enhancing the solubility of the alkyltoluene sulfonate. The composition enhances calcium and sodium ion tolerance of the alkyltoluene sulfonates.

U.S. Pat. No. 6,022,834 discloses an improved alkali surfactant flood process with ultra-low interfacial tension. The surfactant system contains (1) a mixture of anionic surfactants; (2) solvent(s); (3) a strong base; and (4) optionally, a nonionic surfactant or mixtures of nonionic surfactants or sulfates or carboxylates of these nonionic surfactants. The anionic surfactants are sulfonates derived from alkylbenzene, alkylnaphthalene, alkyltoluene or alkylxylene. The alkyl group consists of between about $C_4$ and about $C_{24}$.

U.S. Pat. No. 6,043,391 discloses new anionic surfactants and their method of preparation by simultaneously sulfonating and alkylating an aromatic hydrocarbon. The one-step preparation process involves sulfonating an alpha-olefin with $SO_3$, followed by repeated hydrolysis and dehydration with water which results in the formation of an alkene sulfonic acid. This strong acid is used to alkylate aromatic compounds. Additional strong acid catalyst is beneficial to obtain useful yields of the final product U.S. Pat. No. 6,269,881 discloses an oil recovery process using a particular class of alkylaryl sulfonates derived from an alpha-olefin stream having a broad distribution of even carbon numbers ranging from 12 to 58. The aromatic hydrocarbons used to produce the alkylaryl sulfonates may be benzene, toluene, xylene or mixtures thereof. The surfactant has ultra low interfacial tension with waxy crude oils.

WO 01/98432 A2 discloses a surfactant blend for lowering the interfacial tension between oil and aqueous fluid for enhanced oil recovery. The blend comprises at least one synthetic polyisobutylene and at least one surfactant consisting of sulfonate surfactants, alcohols and non-ionic surfactants.

A general treatise on enhanced oil recovery is *Basic Concepts in Enhanced Oil Recovery Processes* edited by M. Baviere (published for SCI by Elsevier Applied Science, London and New York, 1991).

SUMMARY OF THE INVENTION

The present invention is directed to an under-neutralized alkylxylene sulfonic acid composition for enhanced oil recovery (EOR) processes. The present invention is also directed to a method for enhancing the recovery of oil from a subterranean reservoir which method employs the under-neutralized alkylxylene sulfonic acid compositions of the present invention. The under-neutralized alkylxylene sulfonic acid compositions are employed in an aqueous media. The method optionally employs suitable co-surfactants, such as alcohols, alcohol ethers, polyalkylene glycols, poly (oxyalkylene)glycols and/or poly(oxyalkylene)glycols ethers.

It has been discovered that the under-neutralized alkylxylene sulfonic acid of the present invention provides an EOR surfactant having low IFT compared to the fully-neutralized alkylxylene sulfonic acid. This result is surprising since the surfactants used for EOR in the prior art are fully-neutralized sulfonates.

It has also been discovered that when the alkylxylene used to make the alkylxylene sulfonic acid of the present invention contains greater than 70 percent 4-alkyl-1,2-dimethylbenzene isomer, the alkylxylene sulfonic acid provides an EOR surfactant having low IFT.

In particular, the present invention is directed to an under-neutralized alkylxylene sulfonic acid composition for enhanced oil recovery processes, which composition is a mixture of compounds having the general formula:

(a)
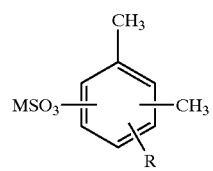

(b)
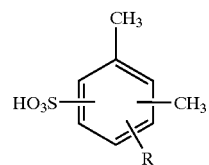

wherein R is an alkyl group containing from about 10 to about 58 carbon atoms, and M is a mono-valent cation, and wherein the alkylxylene moiety in compounds (a) and (b) combined is alkyl-ortho-xylene in at least 85 percent and compound (a) is present in the range of about 80 percent to about 98 percent based on the total under-neutralized alkylxylene sulfonic acid composition.

Preferably, the alkylxylene moiety in compounds (a) and (b) is alkyl-ortho-xylene in at least 95 percent of the total under-neutralized alkylxylene sulfonic acid composition.

Preferably, compound (a) is present in the range of about 85 percent to about 95 percent based on the total under-neutralized alkylxylene sulfonic acid composition. More preferably, compound (a) is present in the range of about 87 percent to about 92 percent based on the total under-neutralized alkylxylene sulfonic acid composition.

The mono-valent cation in the neutralized alkylxylene sulfonic acid compound (a) is an alkali metal. Preferably, the alkali metal is sodium. The mono-valent cation in the neutralized alkylxylene sulfonic acid compound may be an ammonium ion or an organic ammonium ion.

The alkyl group in compounds (a) and (b) in the above under-neutralized alkylxylene sulfonic acid composition is derived from a linear alpha olefin or an isomerized olefin containing from about 10 to about 58 carbon atoms. Preferably, the alkyl group is derived from a linear alpha olefin or an isomerized olefin containing from about 10 to about 40 carbon atoms. More preferably, the alkyl group is derived from a linear alpha olefin or an isomerized olefin containing from about 12 to about 30 carbon atoms.

The alkylxylene moiety in compounds (a) and (b) combined in the under-neutralized alkylxylene sulfonic acid composition contains greater than about 70 percent of the 4-alkyl-1,2-dimethylbenzene isomer. Preferably, the alkylxylene moiety in compounds (a) and (b) combined in the under-neutralized alkylxylene sulfonic acid composition contains greater than about 80 percent of the 4-alkyl-1,2-dimethylbenzene isomer. More preferably, the alkylxylene moiety in compounds (a) and (b) combined in the under-neutralized alkylxylene sulfonic acid composition contains at least 90 percent of the 4-alkyl-1,2-dimethylbenzene isomer. The structures for the 4-alkyl-1,2-dimethylbenzene and the 3-alkyl-1,2-dimethylbenzene are given below.

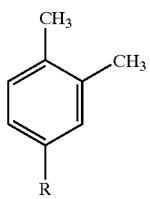
4-alkyl-1,2dimethylbenzene

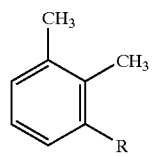
3-alkyl-1,2-dimethyl benzene

The attachment of the alkyl group to the xylene moiety in compounds (a) and (b) combined in the above under-neutralized alkylxylene sulfonic acid composition is at positions higher than the 2-position along the alkyl chain in at least 40 percent of the total under-neutralized alkylxylene sulfonic acid composition. Preferably, the attachment of the alkyl group to the xylene moiety is at positions higher than the 2-position along the alkyl chain in at least 45 percent of the total under-neutralized alkylxylene sulfonic acid composition. Preferably, the attachment of the alkyl group to the xylene moiety is at positions higher than the 2-position along the alkyl chain in at least 60 percent of the total under-neutralized alkylxylene sulfonic acid composition. The structures for the various attachment positions on the carbon chain of the alkyl group to the xylene moiety are given below.

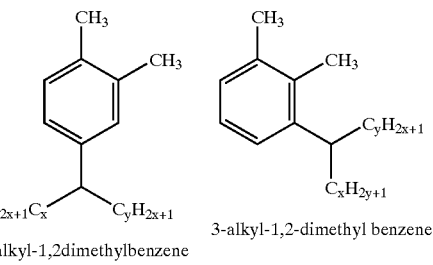

4-alkyl-1,2dimethylbenzene      3-alkyl-1,2-dimethyl benzene

In the above structures, the values of x and y determine the attachment of the alkyl group to the xylene moiety on the carbon chain. For example, for a $C_{12}$ alkyl group, the value of x equal to 2 and y equal to 9 corresponds to the attachment of the alkyl group at the 3-position on the alkyl carbon chain. Thus, for x+y+1 equal to between 10 and 58, knowing x and y provides the attachment of the alkyl group to the xylene moiety for the corresponding chain lengths between $C_{10}$ and $C_{58}$.

The alkyl group in compounds (a) and (b) in the above under-neutralized alkylxylene sulfonic acid composition contains a broad distribution of alkyl chain lengths. A preferred distribution of alkyl chain lengths comprise from about 40 to about 80 percent $C_{12}$ to $C_{20}$. A more preferred distribution of alkyl chain lengths comprise from about 50 to about 70 percent $C_{12}$ to $C_{20}$. The upper heavier range of alkyl chain lengths of $C_{32}$ to C58 may comprise up to about 5 percent to about 15 percent of the alkyl groups, preferably upper heavier range of alkyl chain lengths of $C_{32}$ to $C_{58}$ may comprise up to about percent to about 12 percent of the alkyl groups.

A further embodiment of the present invention is directed to a method for recovering crude oil from a subterranean hydrocarbon containing formation, which method comprises:

(a) injecting into the formation an aqueous solution containing an amount of an under-neutralized alkylxylene sulfonic acid composition effective for the recovery of crude oil wherein the composition is a mixture of compounds having of the general formula:

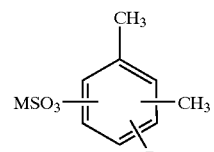 (i)

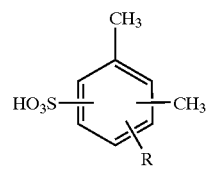 (ii)

wherein R is an alkyl group containing from about 10 to about 58 carbon atoms, and M is a mono-valent cation, and wherein the alkylxylene moiety in compounds (a) and (b) combined is alkyl-ortho-xylene in at least 85 percent and compound (a) is present in the range of about 80 percent to about 98 percent based on the total under-neutralized alkylxylene sulfonic acid composition; and (b) displacing the crude oil with the aqueous solution injected into the formation to thereby recover hydrocarbons from a production well.

In step (a) in the above method, the under-neutralized alkylxylene sulfonic acid composition is present in the range of about 0.03 weight percent to about 2.0 weight percent of the total weight of the aqueous solution. Preferably, the composition is present in the range of about 0.1 weight percent to about 1.5 weight percent of the total weight of the aqueous composition. More preferably, the composition is present in the range of about 0.3 weight percent to about 1.0 weight percent of the total weight of the aqueous composition, and most preferably the composition is present in the range of about 0.5 weight percent to about 0.8 weight percent of the total weight of the aqueous composition.

Preferably in the above method, the alkylxylene moiety in compounds (i) and (ii) in step (a) is alkyl-ortho-xylene in at least 95 percent based on the total under-neutralized alkylxylene sulfonic acid composition.

Preferably in the above method, compound (i) in step (a) is present in the range of about 85 percent to about 95 percent based on the total under-neutralized alkylxylene sulfonic acid composition. More preferably, compound (i) in step (a) is present in the range of about 87 percent to about 92 percent based on the total under-neutralized alkylxylene sulfonic acid composition.

The mono-valent cation in compound (i) in step (a) in the above method is an alkali metal. Preferably, the alkali metal is sodium. The mono-valent cation in step (a) may be an ammonium ion or an organic ammonium ion.

The alkyl group in compounds (i) and (ii) in step (a) of the above method is derived from a linear alpha olefin or an isomerized olefin containing from about 10 to about 58 carbon atoms. Preferably, the alkyl group is derived from a linear alpha olefin or an isomerized olefin containing from about 10 to about 40 carbon atoms. More preferably, the alkyl group is derived from a linear alpha olefin or an isomerized olefin containing from about 12 to about 30 carbon atoms.

The alkylxylene moiety in compounds (a) and (b) combined in the under-neutralized alkylxylene sulfonic acid composition contains greater than about 70 percent of the 4-alkyl-1,2-dimethylbenzene isomer. Preferably, the alkylxylene moiety in compounds (a) and (b) combined in the under-neutralized alkylxylene sulfonic acid composition contains greater than about 80 percent of the 4-alkyl-1,2-dimethylbenzene isomer. More preferably, the alkylxylene moiety in compounds (a) and (b) combined in the under-neutralized alkylxylene sulfonic acid composition contains at least 90 percent of the 4-alkyl-1,2-dimethylbenzene isomer. The structures for the 4-alkyl-1,2-dimethylbenzene and the 3-alkyl-1,2-dimethylbenzene are given below.

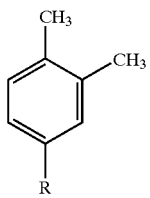
4-alkyl-1,2dimethylbenzene

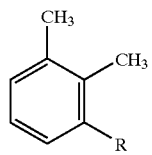
3-alkyl-1,2-dimethyl benzene

In the above method, the alkyl group in compounds (i) and (ii) combined in step (a) is attached to the xylene moiety at positions higher than the 2-position along the alkyl chain in at least 40 percent based on the total under-neutralized alkylxylene sulfonic acid composition. Preferably, the alkyl group is attached to the xylene moiety at positions higher than the 2-position along the alkyl chain in at least 45 percent based on the total under-neutralized alkylxylene sulfonic acid composition. More preferably, the alkyl group is attached to the xylene moiety at positions higher than the 2-position along the alkyl chain in at least 60 percent based on the total under-neutralized alkylxylene sulfonic acid composition. The structures for the various attachment positions on the carbon chain of the alkyl group to the xylene moiety are given below.

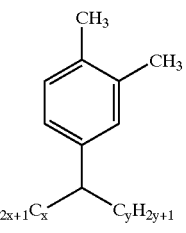
4-alkyl-1,2dimethylbenzene

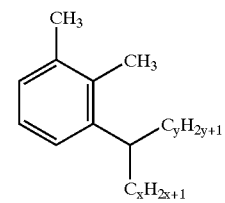
3-alkyl-1,2-dimethylbenzene

In the above structures, the values of x and y determine the attachment of the alkyl group to the xylene moiety on the carbon chain. For example, for a $C_{12}$ alkyl group, the value of x is 2 and y is 9 for the attachment of the alkyl group at the 3-position on the alkyl carbon chain. Thus, for x+y+1 equal to 10 and 58, knowing x or y provides the attachment of the alkyl group to the xylene moiety for the corresponding chain lengths between $C_{10}$ and $C_{58}$.

The alkyl group in compounds (i) and (ii) in step (a) in the above method contains a broad distribution of alkyl chain lengths. A preferred distribution of alkyl chain lengths comprise from about 40 to about 80 percent $C_{12}$ to $C_{20}$. A more preferred distribution of alkyl chain lengths comprise from about 50 to about 70 percent $C_{12}$ to $C_{20}$. The upper heavier range of alkyl chain lengths of $C_{32}$ to $C_{58}$ may comprise from about 5 percent to about 15 percent of the alkyl groups, preferably upper heavier range of alkyl chain lengths of $C_{32}$ to $C_{58}$ may comprise from about 8 percent to about 12 percent of the alkyl groups.

The above method further employs, concurrently with or subsequent to the injection of the aqueous solution in step (a), injecting into the formation an amount of polymer effective for driving the aqueous solution of step (a) into the formation to displace the crude oil to thereby recover hydrocarbons from a production well.

In the above method, the polymer may be any suitable polymer, such as a polysaccharide, a polyacrylamide or a partially hydrolyzed polyacrylamide.

The above method further employs, concurrently or subsequent to the injection of the aqueous solution in step (a), injecting into the formation an amount of water effective for driving the aqueous solution of step (a) into the formation to displace the crude oil to thereby recover hydrocarbons from a production well.

The above method further employs, concurrently with or subsequent to the injection of the polymer, injecting into the formation an amount of water effective for driving the aqueous solution of step (a) or the above polymer into the formation to displace the crude oil to thereby recover hydrocarbons from a production well.

In the above method, the hydrocarbon in the subterranean formation may include a waxy crude oil.

The aqueous solution in step (a) in the above method further employs a co-surfactant having a molecular weight in the range of about 60 to about 1,200.

The co-surfactant in the above method is an alcohol (primary, secondary, tertiary or mixtures thereof), an alcohol ether, a polyalkylene glycol, a poly(oxyalkylene)glycol, a poly(oxyalkylene)glycol ether, or mixtures thereof. The poly(oxyalkylene)glycol ether may be any $C_1$–$C_8$ mono-alkyl ether, such as ethylene or propylene glycol mono-alkyl or mono-phenyl ether, a di-ethylene or di-propylene glycol mono-alkyl or mono-phenyl ether, a tri-ethylene or tri-propylene glycol mono-alkyl or mono-phenyl ether, polyethylene glycol mono-phenyl ether, polypropylene glycol mono-phenyl ether, or mixtures thereof.

Examples of the poly(oxyalkylene)glycol are poly(oxyethylene)glycol and poly(oxypropylene)glycol, or mixtures thereof.

In the above method in step (a) the co-surfactant is in the range of about 0.03 weight percent to about 2.0 weight percent of the total weight of the aqueous solution. Preferably, the co-surfactant is in the range of about 0.1 weight percent to about 1.5 weight percent of the total weight of the aqueous composition. More preferably, the co-surfactant is in the range of about 0.3 weight percent to about 1.0 weight percent of the total weight of the aqueous composition, and most preferably the co-surfactant is in the range of about 0.5 weight percent to about 0.8 weight percent of the total weight of the aqueous composition.

DETAILED DESCRIPTION OF THE INVENTION

Definitions

Figure 1:
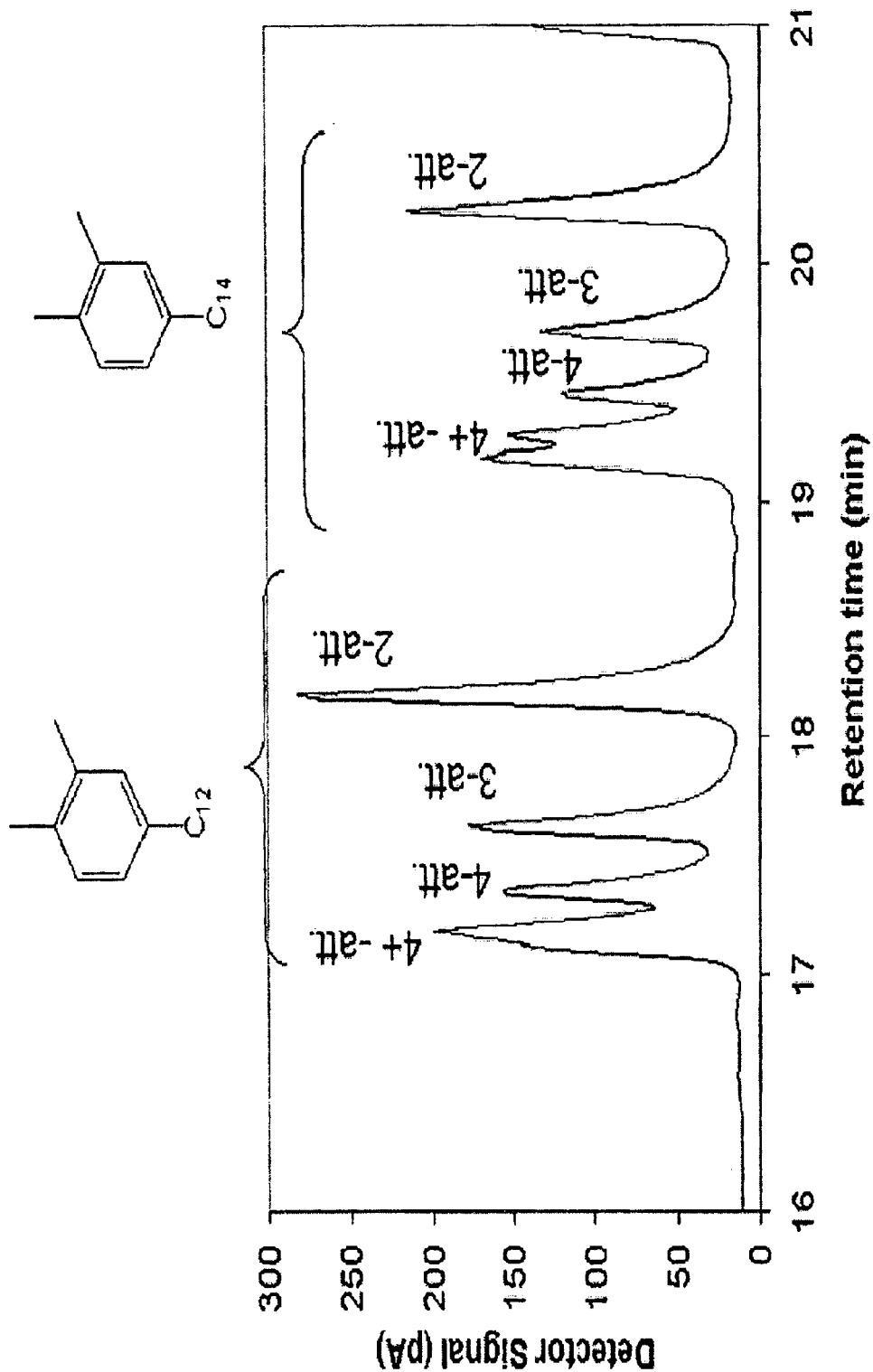
FIG. 1 is a chromatogram obtained by Gas Chromatography on a sample of the alkylxylene prepared using aluminum trichloride in Example 2. The weight percent of the attachment at carbon positions 2, 3, 4 and 4+ for $C_{12}$ and $C_{14}$ carbon chains can be calculated from the area under the resolved peaks shown in the chromatogram.

As used herein, the following terms have the following meanings unless expressly stated to the contrary:

The terms "active" or "actives" as used herein refers to the concentration of sodium alkylxylene sulfonates and the sulfonic acids described in the present invention. The calculation of the actives content is described in Example 4 and the data are summarized in Table II.

The term "alkylate" as used herein refers to the alkylxylene used to prepare the fully-neutralized and under-neutralized sulfonic acids of the present invention. The alkylxylene was prepared using xylene and linear alpha olefin or isomerized olefin containing from about 10 to about 58 carbon atoms. Preferably, the linear alpha olefin or isomerized olefin contains from about 10 to about 40 carbon atoms, and more preferably from about 12 to about 30 carbon atoms.

The term "alkali metal" as used herein refers to Group IA metals of the Periodic Table.

The term "alkoxide" means a compound which can be formed as the reaction product of an alcohol and a reactive metal.

The term "co-surfactant" herein refers to nonionic surfactants that are used in conjunction with anionic surfactants in enhanced oil recovery processes. Generally, nonionic surfactants have a somewhat higher tolerance to polyvalent ions, are water-soluble, and exhibit a wide range of low and stable interfacial tensions between alkaline brine and crude oil. They may also provide a reduction in viscosity of the surfactant.

The terms "enhanced oil recovery" or "EOR" as used herein refer to processes for enhancing the recovery of hydrocarbons from subterranean reservoirs. Techniques for improving displacement efficiency or sweep efficiency may be used for the exploitation of an oil field by introducing displacing fluids or gas into injection wells to drive oil through the reservoir to producing wells.

The terms "Gas Chromatography" or "GC" as used herein refer to Gas Liquid Phase Chromatography.

The term "isomerized olefin" as used herein refers to an alpha olefin that has been subjected to isomerization conditions which results in an alternation of the distribution of the olefin species present and/or the introduction of branching along the alkyl chain.

The terms "interfacial tension" or "IFT" as used herein refer to the surface tension between oil and water. To achieve high enhanced oil recovery, it is necessary to reduce the interfacial tension between the oil and the water in the reservoir to about 0.01 dyne per centimeter. These ultra-low interfacial tensions are measured using a spinning drop tensiometer. Interfacial tension may also be measured by any known method for measuring interfacial tension.

The term "micro-emulsion" as used herein refers to a stable, micellar solution of oil, water, a surfactant and optionally one or more electrolytes. Micro-emulsions are defined as those emulsions having an average particle size of about a few nanometers in diameter.

The term "neutralized" as used herein refers to alkylxylene sulfonic acid neutralized with an inorganic or an organic base, such as an alkali metal hydroxide, oxide and/or alkoxide, ammonia, an organic ammonium cation or an alkanol ammonium cation.

The terms "optimum salinity" or "midpoint salinity" as used herein refer to the amount of salt in the aqueous phase required to minimize the interfacial tension and maximize the recovery of oil.

The term "under-neutralized" as used herein refers to alkylxylene sulfonic acid neutralized with an inorganic or an organic base, and wherein the remaining non-neutralized alkylxylene sulfonic acid is at least 2 weight percent based on the total weight of the neutralized alkylxylene sulfonic acid composition. The percentage of neutralization as defined herein is the weight of the base used divided by the weight of the base necessary to neutralize all the alkylxylene sulfonic acid expressed as a percentage.

The term "waxy crude oil" as used herein refers to crude oil usually consisting of a variety of light and intermediate hydrocarbons, such as paraffins and aromatic hydrocarbons, wax paraffins and a variety of other heavy organic compounds, such as resins and asphaltenes.

Unless otherwise specified, all percentages are in weight percent and the pressure is atmospheric pressure.

The present invention is directed to an under-neutralized alkylxylene sulfonic acid composition for enhanced oil recovery processes. It has surprisingly been discovered that the under-neutralized alkylxylene sulfonic acid composition of the present invention provides a lower interfacial tension compared to the 100 percent neutralized alkylxylene sulfonic acid. A marked decrease in interfacial tension is observed with a 10 percent reduction in neutralization of the alkylxylene sulfonic acids. This result was unexpected since prior art uses of alkylaryl sulfonates for surfactant flooding for enhanced oil recovery techniques employ fully-neutralized, or carbonated, over-based alkylaryl sulfonic acids. Another reason this result was surprising is the well known prior art use of alkaline flooding in enhanced oil recovery processes. Alkaline agents, such as sodium hydroxide, have been added during water flooding and these agents react with the naturally occurring organic acids in the crude oil to produce surface active agents that reduce interfacial tension (similarly to surfactants) between the oil and the water in the reservoir.

Alkylxylene containing from about 10 to about 58 carbon atoms were prepared from xylene. Alkylation catalysts trifluoromethane sulfonic acid ($CF_3SO_3H$) and aluminum trichloride ($AlCl_3$) were used for alkylating xylene. The nature of the alkylation catalyst plays a key role in determining the alkylation position on the xylene ring. $^{13}$C-NMR analysis has shown that aluminum trichloride typically gives more than 90 percent yield of the 4-alkyl-1,2-dimethylbenzene (4-alkyl-ortho-xylene) based on the total amount of the alkylxylene produced. On the other hand, when trifluoromethane sulfonic acid is used as the alkylation catalyst, a mixture of 4-alkyl-1,2-dimethylbenzene (4-alkyl-ortho-xylene) and 3-alkyl-1,2-dimethylbenzene (3-alkyl-ortho-xylene) is obtained. Typically, the yield of the 3-alkyl-1,2-dimethylbenzene (3-alkyl-ortho-xylene) is about 30 percent based on the total amount of the alkylxylene produced.

From the IFT data, it has been surprisingly discovered that the under-neutralized alkylxylene sulfonic acids prepared using the 4-alkyl-1,2-dimethylbenzene (4-alkyl-ortho-xylene) gave lower IFT data than the IFT data obtained for under-neutralized alkylxylene sulfonic acids prepared using the 3-alkyl-1,2-dimethylbenzene (3-alkyl-ortho-xylene).

Similarly, a surprising discovery was made from the IFT data that the attachment position along the carbon chain of the alkyl group to the xylene moiety is important for obtaining lower IFT data. Attachment of the alkyl group to the xylene moiety at positions higher than the 2-position along the alkyl carbon chain provides an EOR surfactant having lower IFT. It is preferred that at least 40 percent of the total under-neutralized alkylxylene sulfonic acid composition has the attachment at positions higher than the 2-position along the alkyl carbon chain. Gas Chromatography (GC) and $^{13}$C-Nuclear Magnetic Resonance ($^{13}$C-NMR) were used to determine the attachment position along the alkyl carbon chain.

Under-neutralized sulfonic acid composition containing more than 40 percent attachment at positions higher than the 2-position along the alkyl carbon chain may be obtained by the use of pre-isomerized olefins containing internal double bonds.

The present invention is also directed to a method for enhancing the recovery of oil from a subterranean reservoir which method comprises injecting into the formation an aqueous solution containing an effective amount of the under-neutralized alkylxylene sulfonic acid composition of the present invention. The under-neutralized alkylxylene sulfonic acid composition is a mixture of compound (a) mono-valent cation neutralized alkylxylene sulfonic acid and compound (b) alkylxylene sulfonic acid.

Any suitable co-surfactants may be used with the alkylxylene sulfonic acids of the present invention. Examples of such co-surfactants are alcohols, alcohol ethers, polyalkylene glycols, poly(oxyalkylene)glycols and poly(oxyalkylene)glycols ethers, which may be optionally used along with the under-neutralized alkylxylene sulfonic acid composition of this invention for surfactant flooding.

Preparation of Alkylxylenes

The alkylxylenes used for the preparation of the under-neutralized alkylxylene sulfonic acids of the present invention may be prepared with normal alpha olefins and isomerized olefins by any method known to a person skilled in the art.

Typically, alkylxylene may be prepared using acid catalysts (Bronsted or Lewis acids), such as hydrogen fluoride, trifluoromethane sulfonic acid or aluminum trichloride. Trifluoromethane sulfonic acid mimics hydrogen fluoride in alkylation reactions and its use is preferred in the laboratory to avoid the hazardous handling of hydrogen fluoride.

The alkylation reaction is typically carried out with a xylene and an olefin in molar ratios from 1:15 to 25:1. Process temperatures can range from about 0° C. to about 200° C. As the olefins have a high boiling point, the process is preferably carried out in the liquid phase.

The alkylation process may be carried out in batch or continuous mode. In the batch mode, a typical method is to use a stirred autoclave, which may be heated or cooled to the desired reaction temperature. At the end of the reaction, the catalyst is either recycled or hydrolyzed.

Procedure for Isomerization of Normal Alpha Olefins

The isomerization of normal alpha olefins is achieved using at least two types of acidic catalysts, solid or liquid. A solid catalyst preferably has at least one metal oxide and an average pore size of less than 5.5 angstroms. More preferably, the solid catalyst is a molecular sieve with a one-dimensional pore system, such as SM-3, MAPO-11, SPO-11, SSZ-32, ZSM-23, MAPO-39, SAPO-39, ZSM-22 or SSZ-20. Other possible solid acidic catalysts useful for isomerization include ZSM-35, SUZ4, NU-23, NU-87 and natural or synthetic ferrierites. These molecular sieves are well known in the art and are discussed in Rosemarie Szostak's *Handbook of Molecular Sieves* (New York, Van Nostrand Reinhold, 1992 and U.S. Pat. No. 5,282,858, which are hereby incorporated by reference for all purposes. A liquid type of isomerization catalyst that can be used is iron pentacarbonyl ($Fe(CO)_5$).

The process for the isomerization of normal alpha olefins may be carried out in batch or continuous mode. The process temperatures can range from 50° C. to 250° C. In the batch mode, a typical method is to use a stirred autoclave or glass flask, which may be heated to the desired reaction temperature. A continuous process is most efficiently carried out in a fixed bed process. Space rates in a fixed bed process can range from 0.1 to 10 or more weight hourly space velocity.

In a fixed bed process, the isomerization catalyst is charged to the reactor and activated or dried at a temperature of at least 150° C. under vacuum or flowing inert, dry gas. After activation, the temperature of the isomerization catalyst is adjusted to the desired reaction temperature and a flow of the olefin is introduced into the reactor. The reactor effluent containing the partially-branched, isomerized olefins is collected. The resulting partially-branched, isomerized olefins contain a different olefin distribution (alpha olefin, beta olefin, internal olefin, tri-substituted olefin, and vinylidene olefin) and branching content than the unisomerized olefin and conditions are selected in order to obtain the desired olefin distribution and the degree of branching.

Procedure for Sulfonation of Alkylxylene

Sulfonation of alkylxylene may be carried out by any method known to a person skilled in the art.

The sulfonation reaction is typically carried out in a continuous falling film tubular reactor maintained at about 55° C. The alkylxylene is placed in the reactor along with the sulfur trioxide diluted with air. The molar ratio of alkylxylene to sulfur trioxide is maintained at about 1.05:1.

Procedure for Neutralization of Alkylxylene Sulfonic acids

Neutralization of alkylxylene sulfonic acids may be carried out in a continuous or batch process by any method known to a person skilled in the art to produce alkylxylene sulfonates.

Generally, the neutralization reaction is carried out in an in-line mixing reactor in which the alkylxylene sulfonic acid and an organic or inorganic base are mixed. The reaction mixture temperature is maintained at about 20° C. The amount of alkali metal used is based on the acid number determined for each alkylxylene sulfonic acid.

EXAMPLES

Example 1

Preparation of Alkylxylene using Trifluoromethane Sulfonic Acid Alkylation Catalyst Example 1A Alkylation of Ortho-xylene with $C_{10}$–$C_{58}$ Normal Alpha Olefins Alkylxylene was prepared using trifluoromethane sulfonic acid alkylation catalyst. To a 3 liter glass reactor were charged, under nitrogen, 904.09 grams of ortho-xylene and 595.91 grams of $C_{10}$–$C_{58}$ normal alpha olefin and allowed to mix. The mixture was heated to 60° C. Next, 41.71 grams of trifluoromethane sulfonic acid was added to the reaction mixture while stirring. A strong exotherm was observed with a temperature increase to 122° C. The reaction mixture was allowed to cool to room temperature for 4 hours and 30 minutes. After this cooling period, the reaction was quenched with cold distilled water, followed by three consecutive water washes to remove the acid catalyst from the organic phase. The organic phase containing the alkylxylene product was dried over magnesium sulfate and the excess ortho-xylene was distilled under reduced pressure using a Rotovap evaporator to recover the alkylxylene product.

Example 1B

Alkylation of Ortho-xylene with $C_{10}$–$C_{58}$ Isomerized Olefin

Alkylxylene was prepared using trifluoromethane sulfonic acid alkylation catalyst. To a 3 liter glass reactor were charged, under nitrogen, 852 grams of ortho-xylene and 600 grams of $C_{10}$–$C_{58}$ isomerized olefin (normal alpha olefin content about 75 percent of the total olefin) and allowed to mix. The reaction mixture was heated to 40° C. Next, 42 grams of trifluoromethane sulfonic acid was added to the reaction mixture while stirring. A strong exotherm was observed with a temperature increase to 90° C. The reaction mixture was allowed to cool 60° C. and held at this temperature for 2 hours. After this cooling period, the reaction was quenched and the alkylxylene was recovered as described above in Example 1A.

Example 1C

Alkylation of Ortho-xylene with $C_{10}$–$C_{58}$ Isomerized Olefin

Alkylxylene was prepared using trifluoromethane sulfonic acid alkylation catalyst. To a 3 liter glass reactor were charged, under nitrogen, 852 grams of ortho-xylene and 600 grams of $C_{10}$–$C_{58}$ isomerized olefin (normal alpha olefin content about 40 percent of the total olefin) and allowed to mix. The reaction mixture was heated to 40° C. Next, 42 grams of trifluoromethane sulfonic acid was added to the reaction mixture while stirring. A strong exotherm was observed with a temperature increase to 90° C. The reaction mixture was allowed to cool 60° C. and held at this temperature for 2 hours. After this cooling period, the reaction was quenched and the alkylxylene was recovered as described above in Example 1A.

Example 2

Preparation of Alkylxylene Using Aluminum Trichloride Alkylation Catalyst Alkylation of Ortho-xylene with $C_{10}$–$C_{58}$ Normal Alpha Olefins Alkylxylene was prepared using aluminum trichloride alkylation catalyst by a contract manufacturer in a continuous process using ortho-xylene and $C_{10}$–$C_{58}$ normal alpha olefins.

Example 3

Preparation of Alkylxylene Sulfonic Acids

Alkylxylene sulfonic acids were prepared using the alkylxylenes prepared in Examples 1 and 2 above.

Sulfonation of the alkylxylene was performed in a continuous falling film flow reactor by contacting the alkylxylene with a stream of air and sulfur trioxide. The molar ratio of the alkylxylene to sulfur trioxide was about 1:0.94. The reactor jacket temperature was maintained around 55° C.

The sulfonic acid product was titrated potentiometrically with a standardized cyclohexylamine solution to determine the weight percent of the sulfonic acid and the sulfuric acid in the samples. The total acid number was also determined using the ASTM Test No. D-664. The results are summarized below in Table I. Two samples of the alkylxylene prepared in Examples 1A, 1B and 1C were sulfonated as described above. The duplicate samples of these alkylxylene sulfonic acids are shown as 1A', 1B' and 1C' in Table I below.

TABLE I

| Example | Catalyst | $RSO_3H$* (weight %) | $H_2SO_4$ (weight %) | Acid Number (mg KOH/g) |
|---------|----------|----------------------|----------------------|------------------------|
| Example 1A  | $CF_3SO_3H$ | 88.8 | 0.77 | 128 |
| Example 1A' | $CF_3SO_3H$ | 88.9 | 0.82 | 128 |
| Example 1B  | $CF_3SO_3H$ | 83.9 | 0.92 | 124 |
| Example 1B' | $CF_3SO_3H$ | 84.4 | 0.91 | 124 |
| Example 1C  | $CF_3SO_3H$ | 83.7 | 0.96 | 124 |
| Example 1C  | $CF_3SO_3H$ | 83.9 | 0.93 | 120 |
| Example 2   | $AlCl_3$    | 86.4 | 0.93 | 118 |

*An average molecular weight of 453 grams per mole is assumed for all sulfonic acids.

An average molecular weight of 453 grams per mole is assumed for all sulfonic acids.

Example 4

Preparation of Under-neutralized and Fully-neutralized Alkylxylene Sulfonic Acids Under-neutralized alkylxylene sulfonic acids and the Comparative fully-neutralized alkylxylene sulfonic acids were prepared using the alkylxylene sulfonic acid prepared in Example 3 above.

Neutralization of the sulfonic acid was performed in a beaker with magnetic stirring. The sulfonic acid was heated to about 40° C. to lower the viscosity of the sulfonic acid. Next, a 50 weight percent aqueous solution of sodium hydroxide was slowly added to the reaction mixture. The temperature of the reaction mixture was maintained below 80° C. to limit the evaporation of water. The sodium hydroxide added was calculated based on the acid number obtained for each sulfonic acid. To prepare the 100 percent neutralized sulfonic acid, the exact amount of sodium hydroxide necessary for the neutralization of all the acid species in the sulfonic acid samples, sulfonic acid and $H_2SO_4$ was added to the reaction mixture based on the Total Acid Number analysis results obtained for the sulfonic acids reported in Table I above. For the 90 percent neutralized Examples (the under-neutralized Examples), 10 percent less sodium hydroxide than calculated for 100 percent neutralization was employed to perform the neutralization. For the 100 percent neutralized Examples, the Comparative Examples, a 100 percent of the calculated sodium hydroxide was employed.

The active content of the sodium alkylxylene sulfonate was calculated using the formula given below:

$$\% \text{ active as sodium sulfonate} = \frac{W_{SA} * W\%_{RSO_3H} * \frac{Mw_{RSO_3Na}}{Mw_{RSO_3H}}}{W_{SA} + W_{NaOH\,sol} * \left(1 + \frac{0.5 * 18}{40}\right)}$$

$W_{SA}$: Weight of sulfonic acid sample (grams)

W % $RSO_{3H}$: Weight percent of alkylxylene sulfonic acid determined by the cyclohexylamine titration Mw $RSO_{3NA}$: Molecular weight of the alkylxylene sodium sulfonate (grams per mole)

Mw $RSO_{3H}$: Molecular weight of the alkylxylene sulfonic acid (grams per mole)

$W_{NAOH\ SOL}$: Weight of the NaOH solution (50 weight %) used for the neutralization surfactant having low IFT.

For the under-neutralized Examples, the remaining sulfonic acid is considered as active. Since less sodium hydroxide solution was used to neutralized the under-neutralized Examples, their active content is slightly higher than the 100% neutralized Examples, the Comparative Examples. 475 g/mol and 453 g/mol were used as average molecular weight of the alkylxylene sodium sulfonate and the alkylxylene sulfonic acid, respectively.

The neutralization and active content data collected for the under-neutralized and fully-neutralized Examples is given below in Table II.

TABLE II

| Example | Neutralization Based on TAN (mol %) | Weight of Sulfonic Acid (g) | Total Acid Number-TAN (mg KOH/g) | NaOH (50% weight in $H_2O$) | Active Content (weight %) |
|---------|---|---|---|---|---|
| Comparative 1A | 100 | 241 | 128 | 43.99 | 76.2 |
| Example 1A     | 90  | 241 | 128 | 39.56 | 77.6 |
| Comparative 1B | 100 | 240 | 124 | 42.44 | 72.7 |
| Example 1B     | 90  | 240 | 124 | 38.19 | 74.0 |
| Comparative 1C | 100 | 240 | 120 | 42.44 | 72.7 |
| Example 1C     | 90  | 240 | 120 | 38.19 | 74.0 |
| Comparative 2A | 100 | 240 | 118 | 40.38 | 75.1 |
| Example 2A     | 90  | 240 | 118 | 36.35 | 76.4 |

Example 5

Determination of the Attachment Position on the Alkyl Carbon Chain to the Xylene Moiety The attachment position on the alkyl carbon chain to the xylene moiety was determined by Gas Chromatograph (GC) and quantitative $^{13}$C-Nuclear Magnetic Resonance spectroscopy ($^{13}$C-NMR).

Since the resolution of the peaks obtained in GC decreases with the retention time, it is possible to accurately quantify the attachment position of alkyl group on the xylene ring only for 12 and 14 carbon atoms on the alkyl chains. Quantitative $^{13}$C-NMR on the other hand provides an average value for all carbon atoms on the alkyl chain lengths.

Figure 2:
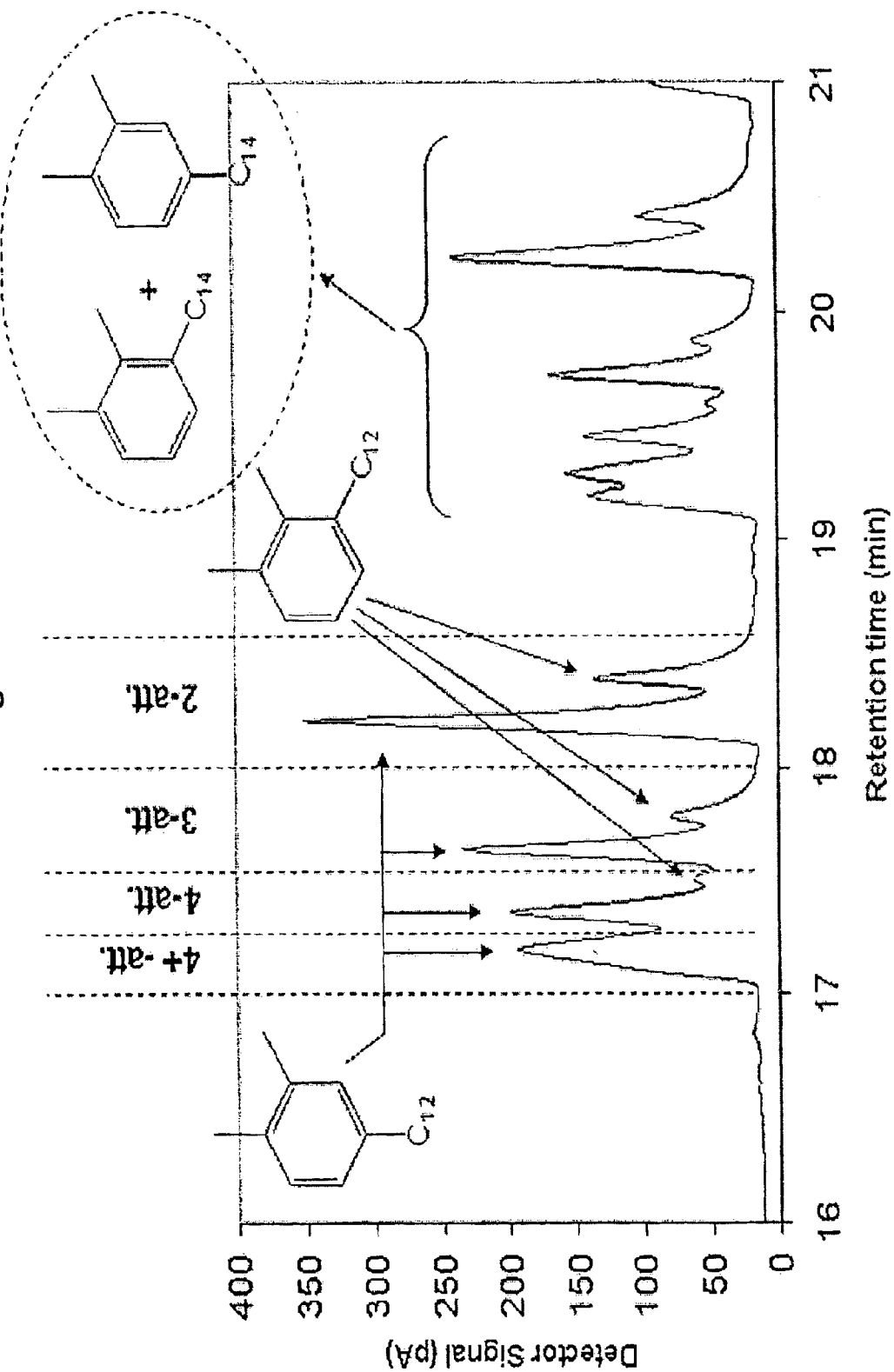
FIG. 2 is similar to FIG. 1 and was obtained on a sample of the alkylxylene prepared using trifluoromethane sulfonic acid in Example 1A.

$^{13}$C-NMR and GC also give the attachment position of the alkyl chain on the ortho-xylene ring. It appears that when aluminum trichloride is used to catalyze the alkylation of ortho-xylene, the isomer formed primarily is 4-alkyl-1,2-dimethylbenzene, whereas when trifluoromethane sulfonic acid is used as alkylation catalysts, a mixture of 3-alkyl-1,2-dimethylbenzene and 4-alkyl-1,2-dimethylbenzene is obtained. FIGS. 1 and 2 show the GC chromatograms obtained for the alkylate portion of the $C_{12}$ and $C_{14}$ ortho-xylene sulfonic acids prepared in Examples 2 and 1A, respectively. The percent of the 4-alkyl-1,2-dimethyl benzene was calculated based by averaging the area of the GC peaks for the 2-position attachment on the alkyl chain for $C_{12}$ and $C_{14}$. The attachment position of the xylene ring on the alkyl carbon chain of the alkyl group was also calculated. The results of the GC chromatography obtained for Examples 1A, 1B, 1C and 2 are given below in Table III. The data show that percent of the 4-alkyl-1,2-dimethylbenzene is much lower in Examples 1A, 1B and 1C when the alkylation catalyst is trifluoromethane sulfonic acid than in Example 2 when aluminum trichloride is used as the alkylation catalyst.

The results obtained by GC and $^{13}$C-NMR for the alkylxylene prepared above in Examples 1 and 2 are given below in Table III.

TABLE III

| Example | Alkylation Catalyst | 4-alkyl-1,2-dimethyl-benzene (% of total alkyl-ortho-xylene) | Alkyl Chain Attachment position | | | | |
|---|---|---|---|---|---|---|---|
| | | | 2 | 3 | 4 | 4+ | 3–4+ |
| Example 1A | $CF_3SO_3H$ | 73 | 35.8 | 21.1 | 17.9 | 25.2 | 64.2 |
| Example 1B | $CF_3SO_3H$ | 71 | 33.9 | 22.2 | 18.7 | 25.2 | 66.1 |
| Example 1C | $CF_3SO_3H$ | 65 | 27.9 | 21.2 | 20.3 | 30.6 | 72.1 |
| Example 2A | $AlCl_3$ | >95 | 50.1 | 21.9 | 11.9 | 16.1 | 49.9 |
| Example 2A* | $AlCl_3$ | >95 | 46.5 | 18.8 | 14.9 | 19.8 | 53.5 |

*The alkyl chain attachment position to the xylene moiety was determined by $^{13}$C-NMR for the alkylxylene prepared in Example 2A.

The alkyl chain attachment position to the xylene moiety was determined by $^{13}$C-NMR for the alkylxylene prepared in Example 2A.

Example 6

Determination of Interfacial Tension

The performance of the under-neutralized alkylxylene sulfonic acids and the fully-neutralized alkylxylene sulfonic acids prepared above in Example 4 was determined by measuring the interfacial tension. The interfacial tension was determined using Minas crude oil (a waxy crude oil) having a pour point around 35° C. and aqueous solutions of the under-neutralized alkylxylene sulfonic acids and the fully-neutralized alkylxylene sulfonic acids. A spinning drop tensiometer was used to measure the interfacial tension at 93° C. using the method described below.

Equilibrated Interfacial Tension Method

A 5 milliliter sample of a solution of alkylxylene sulfonic acid, water, a co-surfactant and sodium chloride was added to an equal volume of crude oil in a glass tube. The test tube was tightly sealed and shaken. The test tube was allowed to equilibrate for one month at 93° C. At the end of the equilibration period, an aliquot of the aqueous phase was loaded into the glass tube of the spinning tensiometer. Next, a small drop of the upper oil phase is injected into the glass tube. The tube is spun and the interfacial tension between the aqueous solution and the oil is determined using the B. Vonnegut equation for elongated droplets given in B. Vonnegut in *Review Scientific Instruments*, 13 (1942) 6:

$$IFT = \frac{w^2 R^3 \Delta\rho}{4}$$

ω being the rotational speed, R the radius of the droplet, and Δp the density difference between the oil and the aqueous solution. It takes typically 1 to 3 hours for the system to reach equilibrium.

Samples of the under-neutralized sulfonic acids and the fully-neutralized alkylxylene sulfonic acids described above in Example 4 were prepared with 0.24 weight percent (on actives basis) of the under-neutralized sulfonic acids and the fully-neutralized alkylxylene sulfonic acids and 0.067 weight percent sec-butyl alcohol as co-surfactant. The interfacial tension data were collected in the presence of sodium chloride solutions between 0.1 percent to 0.5 percent.

The results of the interfacial tension determination are given below in Table IV.

The IFT data for the under-neutralized alkylxylene sulfonic acids was compared to the data for the fully-neutralized alkylxylene sulfonic acids and the percent reduction of IFT was calculated by using the following formula:

$$\%IFT \text{ reduction} = \left(1 - \frac{IFT_{(90\% \text{ neutralized SA})}}{IFT_{(100\% \text{ neutralized SA})}}\right) \times 100$$

SA=sulfonic acid

TABLE IV

| Example | 4-alkyl-1,2-dimethyl benzene (% of total alkyl attachment) | Neutralization (%) | Salinity (weight % NaCl) IFT (dynes/cm) | | | | |
|---|---|---|---|---|---|---|---|
| | | | 0.1 | 0.2 | 0.3 | 0.4 | 0.5 |
| Comparative 1A | 73 | 100 | 2.75 | 0.81 | 0.28 | 0.051 | 0.006 |
| Example 1A | 73 | 90 | 0.75 | 0.36 | 0.09 | 0.016 | 0.004 |
| Reduction in IFT (%) | | — | 73 | 56 | 68 | 68 | 27 |
| Comparative 1B | 71 | 100 | 5.61 | 0.97 | 0.67 | 0.154 | 0.008 |
| Example 1B | 71 | 90 | 1.15 | 0.61 | 0.34 | 0.080 | 0.00037 |
| Reduction in IFT (%) | | — | 79 | 37 | 37 | 48 | 95 |
| Comparative 1C | 65 | 100 | 3.34 | 1.21 | 1.05 | 0.15 | 0.018 |

TABLE IV-continued

| Example | 4-alkyl-1,2-dimethyl benzene (% of total alkyl attachment) | Neutralization (%) | Salinity (weight % NaCl) IFT (dynes/cm) | | | | |
|---|---|---|---|---|---|---|---|
| | | | 0.1 | 0.2 | 0.3 | 0.4 | 0.5 |
| Example 1C | 65 | 90 | 10.71 | 0.25 | 0.34 | 0.08 | 0.004 |
| Reduction in IFT (%) | | | (221) | 79 | 68 | 47 | 78 |
| Comparative 2 | >95 | 100 | 1.71 | 0.009 | 0.002 | 0.09 | 0.089 |
| Example 2 | >95 | 90 | 1.09 | 0.00088 | 0.05 | 0.11 | 0.13 |
| Reduction in IFT (%) | | — | 36 | 90 | (25) | (22) | (46) |

The data in Table IV show a significant decrease in interfacial tension between the under-neutralized alkylxylene sulfonic acids of the present invention and oil compared to the fully-neutralized alkylxylene sulfonic acid. The interfacial tension between the fully-neutralized alkylxylene sulfonic acid composition prepared using trifluoromethane sulfonic acid and oil is higher compared to that obtained for the under-neutralized alkylxylene sulfonic acid composition at all salinities tested except for Example 1C at 0.1 weight percent NaCl. At ultra low salinity of 0.1 percent NaCl, the measured IFT is high and the system is not at the optimum salinity.

The IFT data for the under-neutralized and fully-neutralized alkylxylene sulfonic acids prepared using aluminum trichloride show that the optimum salinity is at about 0.2 weight percent NaCl because all the IFT values at salinities above this are much higher. At 0.3 weight percent NaCl and higher salinities, the fully-neutralized sample gave lower IFT values than the under-neutralized sample. The lowest IFT value of 0.00088 dynes per centimeter was obtained at 0.2 weight percent NaCl for the under-neutralized sample of Example 2, whereas the fully-neutralized sample of Example 2 gave an IFT value of 0.009 dynes per centimeter at this salinity. The lowest IFT value obtained for the under-neutralized alkylxylene sulfonic acid prepared using aluminum trichloride was 0.00088 dynes per centimeter at 0.2 weight percent NaCl compared to 0.002 dynes per centimeter at 0.3 weight percent NaCl obtained for the fully-neutralized alkylxylene sulfonic acids prepared using aluminum trichloride.

The optimum salinity for the fully-neutralized alkylxylene sulfonic acids and the under-neutralized alkylxylene sulfonic acids prepared using trifluoromethane sulfonic acid is higher than that observed for the fully-neutralized alkylxylene sulfonic acids and the under-neutralized alkylxylene sulfonic acids prepared using aluminum trichloride, 0.5 percent sodium chloride and 0.2–0.3 percent sodium chloride, respectively.

Figure 3:
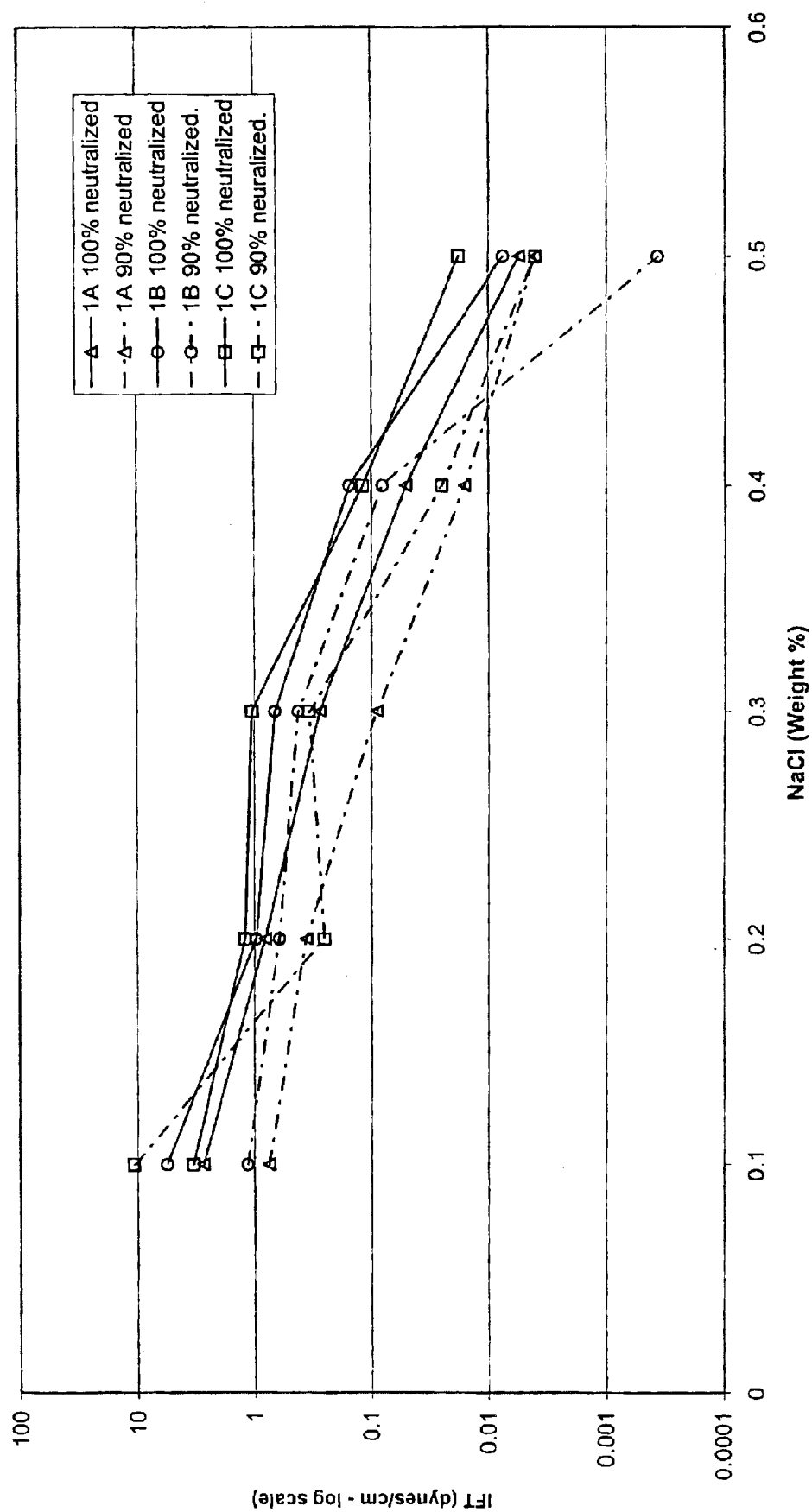
FIG. 3 is a plot of the data collected using the Equilibrated Interfacial Tension Method described below on samples of alkylxylene sulfonic acids prepared using alkylxylene prepared in Examples 1A, 1B and 1C (using trifluoromethane sulfonic acid as the alkylation catalyst).
Figure 4:
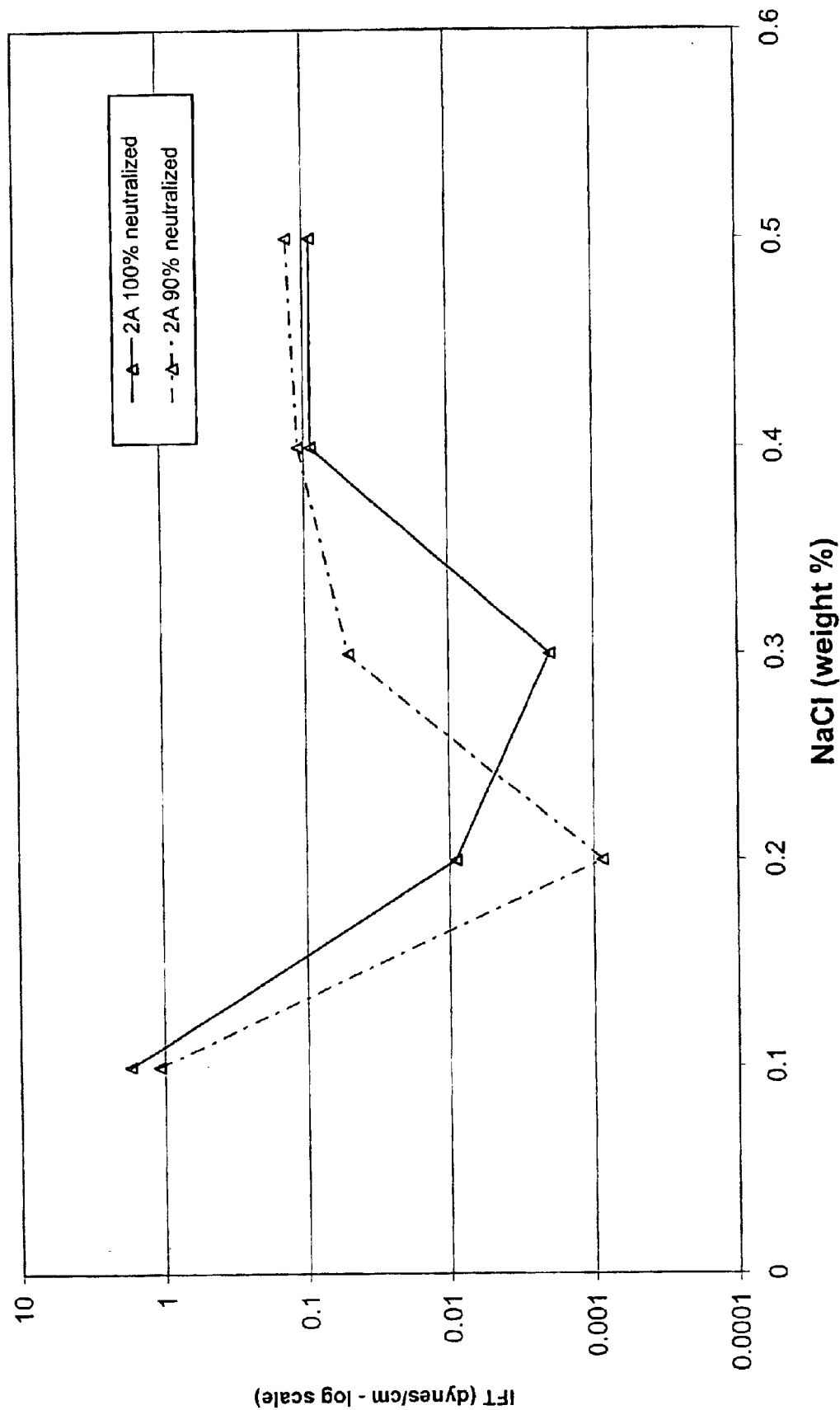
FIG. 4 is a plot of the data collected using the Equilibrated Interfacial Tension Method, described below, on samples of alkylxylene sulfonic acids prepared using alkylxylene prepared in Example 2 (using aluminum trichloride as the alkylation catalyst).

FIG. 3 shows a graph for the IFT data for the fully-neutralized and the 90 percent neutralized alkylxylene sulfonic acids prepared using trifluoromethane sulfonic acid and FIG. 4 shows a graph for the IFT data for the fully-neutralized and the 90 percent neutralized alkylxylene sulfonic acids prepared using aluminum trichloride. The graphs clearly show the reduction in IFT when the alkylxylene sulfonic acids are neutralized only 90 percent instead of 100 percent.

The data in Table IV also show that the under-neutralized alkylxylene sulfonic acid, obtained by alkylation with aluminum trichloride, having greater than 95 percent of the alkylxylene moiety as the 4-alkyl-1,2-dimethylbenzene (4-alkyl-ortho-xylene) isomer is better for enhanced oil recovery of waxy crude oil in reservoirs with salinities between 0.2 percent and 0.3 percent as found in the Minas oil fields in Indonesia than the under-neutralized alkylxylene sulfonic acid, obtained with trifluoromethane sulfonic acid, having between 65–73 percent of the alkylxylene as the 4-alkyl-1,2-dimethylbenzene (4-alkyl-ortho-xylene).

What is claimed is:

1. An under-neutralized alkylxylene sulfonic-acid composition for enhanced oil recovery processes, which composition is a mixture of compounds having the general formula:

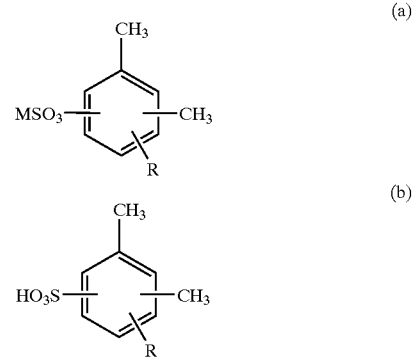

wherein R is an alkyl group containing from about 10 to about 58 carbon atoms, and M is a mono-valent cation, and wherein the alkylxylene moiety in compounds (a) and (b) combined is alkyl-ortho-xylene in at least 85 percent of the total under-neutralized alkylxylene sulfonic acid composition and compound (a) is present in the range of about 80 percent to about 98 percent based on the total under-neutralized alkylxylene sulfonic acid composition.

2. The under-neutralized alkylxylene sulfonic acid composition of claim 1, wherein the alkylxylene moiety in compounds (a) and (b) combined is alkyl-ortho-xylene in at least 95 percent of the total under-neutralized alkylxylene sulfonic acid composition.

3. The under-neutralized alkylxylene sulfonic acid composition of claim 1, wherein compound (a) is present in the range of about 85 percent to about 95 percent based on the total under-neutralized alkylxylene sulfonic acid composition.

4. The under-neutralized alkylxylene sulfonic acid composition of claim 3, wherein compound (a) is present in the range of about 87 percent to about 92 percent based on the total under-neutralized alkylxylene sulfonic acid composition.

5. The under-neutralized alkylxylene sulfonic acid composition of claim 1, wherein the mono-valent cation is an alkali metal.

6. The under-neutralized alkylxylene sulfonic acid composition of claim 5, wherein the alkali metal is sodium.

7. The under-neutralized alkylxylene sulfonic acid composition of claim 1, wherein the mono-valent cation is an ammonium ion or an organic ammonium ion.

8. The under-neutralized alkylxylene sulfonic acid composition of claim 1, wherein the alkyl group is derived from a linear alpha olefin or an isomerized olefin containing from about 10 to about 58 carbon atoms.

9. The under-neutralized alkylxylene sulfonic acid composition of claim 8, wherein the alkyl group is derived from a linear alpha olefin or an isomerized olefin containing from about 10 to about 40 carbon atoms.

10. The under-neutralized alkylxylene sulfonic acid composition of claim 9, wherein the alkyl group is derived from a linear alpha olefin or an isomerized olefin containing from about 12 to about 30 carbon atoms.

11. The under-neutralized alkylxylene sulfonic acid composition of claim 1, wherein the alkylxylene moiety in compounds (a) and (b) combined contains greater than about 70 percent of the 4-alkyl-1,2-dimethyl benzene isomer.

12. The under-neutralized alkylxylene sulfonic acid composition of claim 11, wherein the alkylxylene moiety in compounds (a) and (b) combined contains greater than about 80 percent of the 4-alkyl-1,2-dimethyl benzene isomer.

13. The under-neutralized alkylxylene sulfonic acid composition of claim 12, wherein the alkylxylene moiety in compounds (a) and (b) combined contains at least 90 percent of the 4-alkyl-1,2-dimethyl benzene isomer.

14. The under-neutralized alkylxylene sulfonic acid composition of claim 1, wherein the alkyl group contains a distribution of alkyl chain lengths wherein the alkyl chain lengths comprise from about 40 to about 80 percent $C_{12}$ to $C_{20}$ and about 5 percent to about 15 percent of $C_{32}$ to $C_{58}$.

15. The under-neutralized alkylxylene sulfonic acid composition of claim 14, wherein the distribution of alkyl chain lengths comprise from about 50 to about 70 percent $C_{12}$ to $C_{20}$ and about 5 percent to about 15 percent of $C_{32}$ to $C_{58}$.

16. The under-neutralized alkylxylene sulfonic acid composition of claim 15, wherein the distribution of alkyl chain lengths comprise about 8 percent to about 12 percent of $C_{32}$ to $C_{58}$.

17. A method for recovering crude oil from a subterranean hydrocarbon containing formation, which method comprises:
(a) injecting into the formation an aqueous solution containing an amount of an under-neutralized alkylxylene sulfonic acid composition effective for the recovery of crude oil wherein the composition is a mixture of compounds having of the general formula:

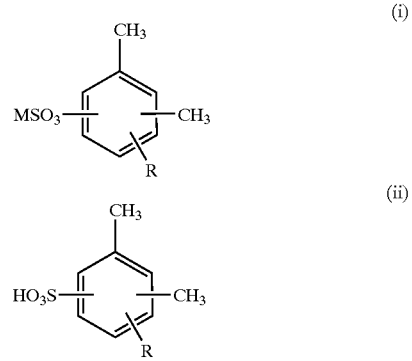

wherein R is an alkyl group containing from about 10 to about 58 carbon atoms, and M is a mono-valent cation, and wherein the alkylxylene moiety in compounds (i) and (ii) combined is alkyl-ortho-xylene in at least 85 percent of the total under-neutralized alkylxylene sulfonic acid composition and compound (i) is present in the range of about 80 percent to about 98 percent based on the total under-neutralized alkylxylene sulfonic acid composition; and
(b) displacing the crude oil with the aqueous solution injected into the formation to thereby recover hydrocarbons from a production well.

18. The method of claim 17, wherein in step (a) the under-neutralized alkylxylene sulfonic acid composition is present in the range of about 0.03 weight percent to about 2.0 weight percent of the total weight of the aqueous solution.

19. The method of claim 18, wherein the under-neutralized alkylxylene sulfonic acid composition is present in the range of about 0.1 weight percent to about 1.5 weight percent of the total weight of the aqueous solution.

20. The method of claim 19, wherein the under-neutralized alkylxylene sulfonic acid composition is present in the range of about 0.3 weight percent to about 1.0 weight percent of the total weight of the aqueous solution.

21. The method of claim 20, wherein the under-neutralized alkylxylene sulfonic acid composition is present in the range of about 0.5 weight percent to about 0.8 weight percent of the total weight of the aqueous solution.

22. The method of claim 17, wherein compound (i) in step (a) is present in the range of about 85 percent to about 95 percent based on the total under-neutralized alkylxylene sulfonic acid composition.

23. The method of claim 22, wherein compound (i) in step (a) is present in the range of about 87 percent to about 92 percent based on the total under-neutralized alkylxylene sulfonic acid composition.

24. The method of claim 17, wherein in compound (i) the mono-valent cation is an alkali metal.

25. The method of claim 24, wherein the alkali metal is sodium.

26. The method of claim 17, wherein the mono-valent cation in compound (i) is an ammonium ion or an organic ammonium ion.

27. The method of claim 19, wherein in step (a) the alkyl group in compounds (i) and (ii) is derived from a linear alpha olefin or an isomerized olefin containing from about 10 to about 58 carbon atoms.

28. The method of claim 27, wherein in step (a) the alkyl group in compounds (i) and (ii) is derived from a linear alpha olefin or an isomerized olefin containing from about 10 to about 40 carbon atoms.

29. The method of claim 28, wherein in step (a) the alkyl group in compounds (i) and (ii) is derived from a linear alpha olefin or an isomerized olefin containing from about 12 to about 30 carbon atoms.

30. The method of claim 17, wherein the alkylxylene moiety in compounds (i) and (ii) combined in step (a) contains greater than about 70 percent of the 4-alkyl-1,2-dimethyl benzene isomer.

31. The method of claim 30, wherein the alkylxylene moiety in compounds (i) and (ii) combined in step (a) contains greater than about 80 percent of the 4-alkyl-1,2-dimethylbenzene isomer.

32. The method of claim 31, wherein the alkylxylene moiety in compounds (i) and (ii) combined in step (a) contains at least 90 percent of the 4-alkyl-1,2-dimethylbenzene isomer.

33. The method of claim 17, wherein in step (a) the alkyl group in compounds (i) and (ii) contains a distribution of alkyl chain lengths and wherein the alkyl chain lengths comprise from about 40 to about 80 percent $C_{12}$ to $C_{20}$ and about 5 percent to about 15 percent of $C_{32}$ to $C_{58}$.

34. The method of claim 33, wherein the distribution of alkyl chain lengths comprise from about 50 to about 70 percent $C_{12}$ to $C_{20}$ and about 5 percent to about 15 percent of $C_{32}$ to $C_{58}$.

35. The method of claim 34, wherein the distribution of alkyl chain lengths comprise about 8 percent to about 12 percent of $C_{32}$ to $C_{58}$.

36. The method of claim 17, wherein the hydrocarbon in the subterranean formation is a waxy crude oil.

37. The method of claim 17, wherein the method further comprises, concurrently with or subsequent to the injection of the aqueous solution of step (a), injecting into the formation an amount of polymer effective for driving the aqueous solution of step (a) into the formation to displace the crude oil to thereby recover hydrocarbons from a production well.

38. The method of claim 37, wherein the polymer is a polysaccharide, an acrylamide or a partially hydrolyzed polyacrylamide.

39. The method of claim 17, wherein the method further comprises, concurrently with or subsequent to the injection of the aqueous solution of step (a), injecting into the formation an amount of water effective for driving the aqueous solution of step (a) into the formation to displace the crude oil to thereby recover hydrocarbons from a production well.

40. The method of claim 37, wherein the method further employs, concurrently with or subsequent to the injection of the polymer, injecting into the formation an amount of water effective for driving the aqueous solution of step (a) into the formation to displace the crude oil to thereby recover hydrocarbons from a production well.

41. The method of claim 17, wherein the aqueous solution in step (a) further contains a co-surfactant having a molecular weight in the range of about 60 to about 1,200.

42. The method of claim 41, wherein the co-surfactant is an alcohol, an alcohol ether, a polyalkylene glycol, a poly(oxyalkylene)glycol, a poly(oxyalkylene)glycol ether, or mixtures thereof.

43. The method of claim 42, wherein the poly(oxyalkylene) glycol ether is an ethylene glycol mono-alkyl or mono-phenyl ether, a di-ethylene glycol mono-alkyl or mono-phenyl ether, a tri-ethylene glycol mono-alkyl or a mono-phenyl ether, a polyethylene glycol mono-phenyl ether, a polypropylene glycol mono-phenyl ether, or mixtures thereof.

44. The method of claim 43, wherein the poly(oxyalkylene) glycol is a poly(oxyethylene) glycol or a poly(oxypropylene) glycol, or mixtures thereof.

45. The method of claim 41, wherein in step (a) the co-surfactant is in the range of about 0.03 weight percent to about 2.0 weight percent of the total weight of the aqueous solution.

46. The method of claim 45, wherein the co-surfactant is present in the range of about 0.1 weight percent to about 1.5 weight percent of the total weight of the aqueous solution.

47. The method of claim 46, wherein the co-surfactant is present in the range of about 0.3 weight percent to about 1.0 weight percent of the total weight of the aqueous solution.

48. The method of claim 47, wherein the co-surfactant is present in the range of about 0.5 weight percent to about 0.8 weight percent of the total weight of the aqueous solution.

* * * * *